US012638073B2

(12) United States Patent    (10) Patent No.:   US 12,638,073 B2

Bruns et al.      (45) Date of Patent:    May 26, 2026

(54) PLANETARY GEARBOX DEVICE COMPRISING OIL FEED NOZZLES AND OIL FEED CHANNELS ARRANGED ECCENTRICALLY INSIDE PLANET GEARS, CORRESPONDING INDUSTRIAL GEARBOX, CORRESPONDING USE, AND CORRESPONDING METHOD

(71) Applicant: Flender GmbH, Bocholt (DE)

(72) Inventors: Christoph Bruns, Bocholt (DE);
Michael Klein-Hitpass, Bocholt (DE);
Michael Tegelkamp, Bocholt (DE);
Eugen Schlegel, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/852,952

(22) PCT Filed: Mar. 6, 2023

(86) PCT No.: PCT/EP2023/055567

§ 371 (c)(1),
(2) Date: Sep. 30, 2024

(87) PCT Pub. No.: WO2023/186458

PCT Pub. Date: Oct. 5, 2023

(65) Prior Publication Data

US 2025/0215970 A1     Jul. 3, 2025

(30) Foreign Application Priority Data

Apr. 1, 2022    (EP) .................................... 22166296

(51) Int. Cl.
*F16H 57/04*      (2010.01)

(52) U.S. Cl.
CPC ......... *F16H 57/043* (2013.01); *F16H 57/046* (2013.01); *F16H 57/0479* (2013.01); *F16H 57/0482* (2013.01)

(58) Field of Classification Search
CPC .............. F16H 57/043; F16H 57/0456; F16H 57/0479; F16H 57/0482
See application file for complete search history.

(56) References Cited

U.S. PATENT DOCUMENTS 8,591,371 B2 * 11/2013 Dinter ................. F16C 33/1055
                                         475/160
10,948,071 B2 * 3/2021 Meyer ................. F16H 57/0486

(Continued)

FOREIGN PATENT DOCUMENTS

AU      2009200021      7/2009
CN      102022287 B     4/2011

(Continued)

OTHER PUBLICATIONS

JP H08277909 A (Year: 1996).*

(Continued)

*Primary Examiner* — Derek D Knight
(74) *Attorney, Agent, or Firm* — Henry M. Feiereisen LLC

(57) ABSTRACT

A planetary gear unit apparatus, in particular for an industrial gear unit, for example in the case of a vertical orientation of a drive train, includes a planetary carrier, a gear unit housing, at least one nozzle provided in/on the gear unit housing and designed to feed an oil medium, and planetary gears coupled to the planetary carrier. Each planetary gear includes an eccentrically arranged and axially running feed channel for oil medium. At least one nozzle is provided in an oil-communicating relation/arrangement with respect to the feed channel or to a corresponding circulating diameter (Continued)

of the feed channels. The planetary gears circulate in planetary ring gear supported in the gear unit housing.

21 Claims, 2 Drawing Sheets

(56)                    References Cited

U.S. PATENT DOCUMENTS

| | | | |
|---|---|---|---|
| 2016/0153545 A1 | 6/2016 | Kücücyavuz et al. | |
| 2016/0265651 A1 | 9/2016 | Smook | |
| 2018/0080542 A1* | 3/2018 | Sugiyama | B60K 6/405 |
| 2019/0085972 A1 | 3/2019 | Uhkoetter et al. | |
| 2019/0242470 A1 | 8/2019 | Schmidt et al. | |
| 2021/0088142 A1 | 3/2021 | Hetmaniok | |
| 2022/0290719 A1* | 9/2022 | Meyer | F16C 17/02 |
| 2022/0389873 A1* | 12/2022 | Uhkoetter | F02C 7/36 |

FOREIGN PATENT DOCUMENTS

| | | | | |
|---|---|---|---|---|
| CN | 105705836 | 6/2016 | | |
| DE | 10 2007 028896 A1 | 1/2009 | | |
| DE | 102010031161 | 1/2012 | | |
| DE | 10 2010043817 | 5/2012 | | |
| DE | 102010043816 | 5/2012 | | |
| DE | 102016012501 | 4/2018 | | |
| DE | 102019116974 | 12/2020 | | |
| DE | 102019214380 | 3/2021 | | |
| EP | 3290725 A1 * | 3/2018 | ......... | F16C 33/1065 |
| JP | 5-18457 | 1/1993 | | |
| JP | H08277909 A * | 10/1996 | ........ | F16H 57/0479 |
| JP | 2012-132333 | 7/2012 | | |

OTHER PUBLICATIONS

EP 3290725 A1 (Year: 2018).*
International Search Report issued on May 4, 2023 by the European Patent Office in International Application PCT/EP2023/055567.
European Search Report issued on Aug. 26, 2022 by the European Patent Office in European Application No. EP 22 16 6296.
English translation of European Search Report issued on Aug. 26, 2022 by the European Patent Office in European Application No. EP 22 16 6296.

* cited by examiner

PLANETARY GEARBOX DEVICE COMPRISING OIL FEED NOZZLES AND OIL FEED CHANNELS ARRANGED ECCENTRICALLY INSIDE PLANET GEARS, CORRESPONDING INDUSTRIAL GEARBOX, CORRESPONDING USE, AND CORRESPONDING METHOD

CROSS-REFERENCES TO RELATED APPLICATIONS

This application is the U.S. National Stage of International Application No. PCT/EP2023/055567, filed Mar. 6, 2023, which designated the United States and has been published as International Publication No. WO 2023/186458 A1 and which claims the priority of European Patent Application, Serial No. 22166296.8, filed Apr. 1, 2022, pursuant to 35 U.S.C. 119 (a)-(d).

TECHNICAL FIELD

The invention relates to a planetary gear unit apparatus, in particular for industrial gear units, wherein the planetary gear unit apparatus has: a planetary carrier with planetary gears coupled to it, and a planetary ring gear which is supported in a gear unit housing; wherein at least one nozzle for feeding in oil medium is provided in/on the gear unit housing, wherein in each case at least one eccentrically arranged and axially running feed channel for oil medium is provided in the planetary gears, with the at least one nozzle in an advantageous oil-communicating relation/arrangement. The invention also relates to a corresponding industrial gear unit and corresponding uses, for example, for vertical mills or wind power plants, and to a corresponding oil supply/feeding method.

BACKGROUND OF THE INVENTION

In the case of the development and construction of gear units, it is also to be considered, inter alia, that the heat which occurs during operation as a result of power loss is discharged sufficiently effectively from the gear unit. Furthermore, a large number of gear unit components require lubrication, in particular in order to keep the friction losses low and for it to be possible for the wear rate to be kept low, in particular in bearings and on toothing systems. In conjunction with these two functions, in particular, the gear unit oil fulfills a highly important role. It is a very great challenge here in the case of many gear unit constructions for all relevant locations and/or components to be supplied with oil which is as fresh and cool as possible, in particular if the gear unit is not intended to be filled completely with oil here, which also applies, in particular, to the vertical installation situation (axial direction of the drive train oriented at least approximately vertically).

Up to now, oil transfer points between stationary and rotating components have been provided in many (planetary) gear units, in particular in order for it to be possible for the oil to be fed at a defined pressure to the respective intended location, for example to rotating components which require lubricant. These oil transfer points are comparatively complex, however, with regard to the manner of construction and manufacture, and are therefore also correspondingly complicated in design and realization; the friction losses which occur on account of the contact usually required at oil transfer points between rotating and stationary components and the associated increased wear are also to be considered disadvantageous.

The following publications describe different proposed solutions, in particular based on transfer points: CN 105705836 A, DE 10 2010 043 816 A1, DE 10 2010 043 817 A1 and AU 2009200021 A1 describe a lubrication of the planetary bearings via transfer points and lubricating bores coaxially with respect to the sun and/or via bores in the planetary shaft and/or via intermediate chambers. DE 10 2010 031 161 A1 describes a lubrication of the bearings of the planetary carrier via transfer points and lubricating bores. DE 10 2019 214 380 A1 generally describes a seal design for an output shaft. DE 10 2016 012 501 A1 generally describes a gear unit housing and sealing by means of shaft sealing rings.

Further oil feeding arrangements are described in the following publications: DE 10 2019 116 974 A1, US 2019/085972 A1, DE 10 2007 028 896 A1.

Proceeding from this prior art, there is also interest in an even more advantageous realization capability of the functional scope ensured by oil/lubricants in (planetary) gear units. Here, in particular, a construction concept which can be realized as simply and technically easily as possible is also intended to be paramount.

SUMMARY OF THE INVENTION

It is the object of the present invention to indicate measures which enable an effective realization of the functional scope, ensured by oil/lubricants in planetary gear units, in a simple way, in particular also in as variable a way as possible for different types of planetary gear units and/or planetary gear unit constructions.

The object is achieved by way of a planetary gear unit apparatus as set forth hereinafter, by way of an industrial gear unit as set forth hereinafter, and by way of uses as set forth hereinafter, and by way of a method as set forth hereinafter. Preferred refinements are specified in the subclaims and in the following description which can each represent one aspect of the invention individually or in combination with one another. If a feature is shown in combination with another feature, this serves merely for the simplified summary of the invention and is not intended in any way to mean that this feature cannot also be a development of the invention without the other feature.

Accordingly, one aspect of the invention relates to the provision of oil medium on/in the gear unit and the feeding (in) of oil medium to individual gear unit components.

In this regard, a planetary gear unit apparatus is provided, in particular, for industrial gear units, for example in a vertical orientation of the drive train, wherein the planetary gear unit apparatus has: a planetary carrier with planetary gears coupled to it, and a planetary ring gear which is supported in a gear unit housing; wherein at least one nozzle for feeding in oil medium is provided in/on the gear unit housing, in particular also in an oil-communicating relation/arrangement with respect to an end side of the planetary carrier, wherein in each case at least one eccentrically arranged and axially (preferably exactly axially, that is to say orthogonally with respect to the radial direction) running feed channel for oil medium being provided in the planetary gears, namely with the at least one nozzle in an oil-communicating relation/arrangement with respect to the feed channel or with respect to a corresponding circulating diameter of the feed channels. In this regard, it is proposed according to the invention for the oil medium to be provided without a predefined punctiform contacting transfer point at least for the planetary gears and optionally also for further gear unit components, in particular also for the bearings of the (sun) shaft and planetary carrier. This not least also provides a great variability and flexibility and simple scalability with regard to structural and/or size or power output adaptations. In this regard, the invention is also based on the concept of providing the oil medium in a contactless manner by way of spraying at at least one point (nozzle) for at least one predefinable region, in particular with an axial spray direction and optionally also with an axial/radial spray direction or else a purely radial spray direction.

Within the context of a highly simple, compact implementation without oil transfer points and without predefined pilot pressure with regard to oil transfer points of this type, it can also be ensured, in particular, in the case of a combination of the measures described herein that oil (medium) is conveyed in sufficient quantity in a contactless manner (that is to say, without physical transfer means) to the desired/required points in the gear unit or is sprayed there or is provided there. For example, the (respective) contactless spray region in the axial direction is a length in accordance with the axial extent of the bearings to be sprayed, and/or, for example, the (respective) contactless spray region in the radial direction is a length in accordance with half the diameter of the planetary gears.

The reach of the distribution of oil medium starting from the points/outlets of the nozzles can be predefined, in particular, in a manner which is dependent on a pilot pressure and also on the configuration of the nozzle, and can be up to 300 mm, for example.

A highly efficient way for lubrication can also be achieved, in particular, in the case of a combination of the measures described herein which can be realized in a comparatively simple way both in a structural and in a manufacturing regard. In contrast to the methods of construction available up to now in the prior art, the measures proposed according to the invention can be implemented comparatively inexpensively and simply. In particular, advantages in the operating behavior also result by virtue of the fact that the measures proposed according to the invention can be implemented without rubbing seal elements, that is to say in a contactless manner, in particular, by way of spraying; as a result, additional friction losses can also be avoided. In particular, the elastomer components which are usually subject to a high wear rate and have had to be replaced frequently up to now are not necessary between moving parts. In addition, expensive, obliquely running bores can also be saved as a result of the free oil flow in the gear unit.

Here, in particular, a nozzle is to be understood to mean a non-physical attached oil outlet, from which the oil medium can be output under predefinable outlet parameters, in particular can be sprayed into the gas phase, in particular in the case of a predefinable quantity, direction and/or dispensing pressure. The nozzles which are denoted generally here as nozzles can also be described as oil feed nozzles or oil spray nozzles or orifice bores configured for contactless feeding of oil medium, in particular with the respective nozzle in an oil-communicating (in particular spray-related) relation/arrangement with at least one of the following components: bearing of the (sun) shaft, bearing of the planetary carrier, end side of the planetary carrier (in particular, end side of the respective planetary gear or the shaft of the respective planetary gear), shoulder or radial/axial side flank of the planetary carrier, baffle plate unit.

Here, an oil-communicating, in particular spray-related relation is also to be understood to mean an effective spray reach of the respective nozzle.

Personified terms, unless worded in the neuter here, can relate to all genders within the context of the present disclosure. Any English language terms or abbreviations used here are each routine technical terms in the field and are familiar in the English language to a person skilled in the art. Any literal translations of German language terms which are/can be used synonymously can be indicated here for the sake of completeness in (brackets), or vice versa.

In gear units up to now, rubbing or physically predefined oil transfer points have usually been required or provided between stationary and rotating components. In contrast, the finding can also be utilized according to the invention that the oil medium can also be fed in without contact without physically predefined transmission media or transmission points. If, in particular, an oil reservoir which is sealed off counter to the centrifugal force and is fed by at least one nozzle is in a flow connection to the eccentrically arranged axial feed channels described herein, the oil supply can be realized with highly satisfactory reliability by way of measures which can be implemented comparatively simply, in particular also largely independently of any provided or instantaneous/actual oil level in the gear unit housing. In addition, the structural configuration and also the manner of the oil feed can be of highly compact and technically simple configuration here. It can also be noted in this regard that, according to the invention, no predefined oil level at all is required or has to be provided; rather, it can be provided in accordance with a through-feed principle that oil medium which is fed in can also be discharged again from the housing without a significant dwell time, as a result of which not least also an advantageous cooling effect can be ensured (if desired/required).

If, according to the present disclosure, a vertical direction or vertical installation position is taken into consideration with regard to the planetary gear unit or industrial gear unit, this relates to the installation position as intended, in the case of which the center lines and the rotational axis of the respective gear unit component and the power shaft (also in each case called the axial direction here) are oriented in the vertical direction, that is to say along the direction of gravity.

If, according to the present disclosure, a planetary gear unit apparatus is mentioned, the corresponding disclosure can also relate to a single planetary gear unit stage or one of a plurality of planetary gear unit stages of an industrial gear unit.

At least one output/spray direction is preferably defined by way of a respective nozzle; the oil medium at a corresponding output/spray point can optionally also be output in a plurality of directions, for example by a plurality of nozzles being provided there. In particular, a nozzle which is arranged in a defined radial or peripheral position is connected in terms of open/closed loop control to an oil supply (or to a control unit which regulates the oil supply), in particular in such a way that the operating characteristic of a respective nozzle or the respective nozzles arranged in the predefined corresponding (radial) positions can be set individually, for example also in a manner which is dependent on instantaneous operating parameters of the planetary gear unit.

In accordance with one exemplary embodiment, the respective at least one eccentrically arranged and axially running feed channel of the respective planetary gear is provided at least as far as a central axial region of the planetary gear, in particular as far as half the axial length of the toothing portion, and is guided or connected radially to the outside there, in particular exclusively radially to the outside. This also facilitates a fluid-dynamically initiated oil flow. The radial connector can be provided, for example, in the manner of a radial outlet or aperture, in particular in such a way that the feed channel runs substantially axially and at least one radial outlet is provided only at the provided output point. Depending on the configuration of the bearing, it can also be expedient for a plurality of radial outlets to be provided. In particular, this can also be predetermined individually in the respective application by a person skilled in the art more closely involved with the planetary gear unit apparatus described in the present case, in a manner which is dependent on operating conditions such as, for example, rotational speed, viscosity and the like.

In accordance with one exemplary embodiment, the respective eccentrically arranged axial feed channel has exclusively strictly axially and/or strictly radially pointing portions, wherein a (possible) radially oriented portion is preferably configured merely as a type of radially oriented outlet, for example in the manner of a very short bore which ends radially (in particular, orthogonally with respect to the axial portion). This also enables or facilitates an advantageous use of fluid mechanical effects, and can facilitate an output of oil which is as targeted as possible spatially and/or with regard to the quantity.

In accordance with one exemplary embodiment, the respective eccentrically arranged axial feed channel opens at a bearing of the respective planetary gear, in particular between two bearing portions which adjoin one another axially. This not least also enables an effective distribution of the oil medium starting from a comparatively small number of oil outlets. The outlet points are not additionally provided oil transfer points, but rather an interface, at which a relative movement due to the bearings takes place in any case, which relative movement can advantageously be used for the provision and distribution of the oil medium according to the present disclosure.

In accordance with one exemplary embodiment, the respective planetary gear is mounted about a planetary shaft which is mounted such that it cannot rotate on the planetary carrier, in particular by means of an anti-rotation safeguard, wherein the eccentrically arranged axial feed channel is provided in the respective planetary shaft. This not least also fosters an advantageous relative and absolute arrangement of the eccentric feed channel, and facilitates the specification of predefined flow conditions, in particular also in a manner which is dependent on centrifugal forces.

In accordance with one exemplary embodiment, the planetary gears are mounted rotatably about a/the respective planetary shaft in such a way that the respective planetary shaft remains oriented in a predefined circumferential/orienting position, in particular with the respective eccentrically arranged and axially running feed channel in a predefined eccentric radial position which lies to a maximum extent radially on the outside with regard to the instantaneous center of rotation (center point of the rotational movement of the planetary carrier). This also fosters the setting of permanently constant operating conditions, and accordingly also facilitates the predefining of certain oil flow conditions.

In accordance with one exemplary embodiment, at least one nozzle is guided, or is oriented, into a region on the end side of the respective planetary gear shaft or on the end side with respect to a circulating diameter of the planetary gear shafts. This not least also facilitates forwarding or outputting of the oil to the eccentric axial feed channels.

In accordance with one exemplary embodiment, the planetary gear unit apparatus has a plurality of nozzles for providing oil medium which are arranged distributed over the (internal) periphery of the gear unit housing in the radial direction and/or in the peripheral direction. The number and the relative arrangement of the nozzles can be optimized individually by a person skilled in the art depending on the structural configuration of the gear unit and the individual gear unit components and any desired oil level (filling level, oil medium). A uniform distribution over the periphery, in particular with regard to a defined arrangement diameter, also supplies conditions which are as exact as possible at each angular/circulating position of the individual gear unit components.

In accordance with one exemplary embodiment, at least one (further) nozzle is guided, or is oriented, into a region on the end side of a bearing of the planetary carrier and/or on the end side of a bearing of a (sun) shaft which is guided within the planetary carrier. This also enables the output of oil medium at a plurality of advantageous points, wherein parameters which are individual in a nozzle-specific manner in each case can optionally also be set (for example, throughflow, pressure or the like).

In accordance with one exemplary embodiment, the planetary carrier is configured without feed channels on the inlet side, that is to say on a flow path portion of the oil medium which figuratively speaking corresponds to a/the pressure side. In other words: the feeding in of the oil medium, in particular as far as the bearings of the planetary gears, preferably takes place exclusively via the feed channels in the planetary gear shafts. This arrangement also enables or facilitates the realization of an advantageous fluid-dynamic effect in the manner of a suction side, in particular thanks to high centrifugal forces.

In accordance with one exemplary embodiment, the oil feed takes place on an oil flow path which is defined by way of at least one feed channel, does not run through the planetary carrier at least on the pressure side on the way as far as the planets (or at most through the planets), or ends in front of the planetary carrier on the pressure side. This also makes it possible for a driving force to be built up in the planetary carrier over a great radius on the outlet side or suction side.

The pressure side is understood to mean here, in particular, that portion of the channel-bound oil flow path, in which gravitational forces and/or centrifugal forces act fluid-dynamically in an oil supply direction as intended, in particular without an actively produced technical pressure column, that is to say without a technical system-side pilot pressure.

In accordance with one exemplary embodiment, a baffle plate unit is provided on the end side of the planetary gears, in particular in a radial overlap of the respective eccentric feed channel, in particular in a radially inwardly open arrangement (and in a radially outwardly closed or terminating/sealing arrangement), in particular in an arrangement which is fastened to the planetary carrier. As a result, a type of reservoir can also be formed, from which the oil medium can then be removed and forwarded on the oil flow path which is defined by way of the eccentric axial feed channels, in particular also based on a suction effect starting from radially oriented discharge channels in the planetary carrier. For example, the baffle plate unit forms, with the planetary carrier end side, a pocket or cavity for radial retention of oil medium counter to centrifugal forces which act. The baffle plate unit is preferably configured as a flat ring, that is to say is configured/provided over the full circumference. The reservoir which is formed from the baffle plate unit or the corresponding cavity for receiving oil medium is preferably configured/provided over the full circumference.

In accordance with one exemplary embodiment, a/the baffle plate unit, in an oil-communicating relation with respect to the eccentric feed channels, of the planetary gear unit apparatus is arranged during operation as intended in such a way that an oil reservoir is formed which is sealed off counter to the centrifugal force and is fed by at least one nozzle, in particular in the case of a vertical orientation of the axial direction of the drive train or the center longitudinal axis of the drive train. This also not least facilitates a robust and simple way of distribution of the oil medium, in particular with a buffer function, that is to say at least partially decoupled from an (instantaneous) method of operation of the nozzles. In other words: a/the baffle plate unit which is in an oil-communicating relation with respect to the eccentric feed channels can surround an oil reservoir which is sealed off counter to the centrifugal force during operation as intended, wherein the feed channels can be fed via the oil reservoir, in particular also with satisfactory system reliability.

In accordance with one exemplary embodiment, the center longitudinal axis of the planetary gear unit apparatus is optionally oriented horizontally or vertically. The way according to the invention of oil feeding and distribution can be realized largely independently of the axial orientation of the gear unit. A/the baffle plate unit, in oil-communicating relation with respect to the eccentric feed channels, of the planetary gear unit apparatus is selectively arranged during operation as intended significantly above an oil level which is possibly desired or is instantaneously set in the housing. An/the actual oil level can optionally be very low, in particular since the eccentric feed channels can also be fed directly via the nozzles, in particular in conjunction with an oil reservoir which is provided peripherally and on the end side on the planetary carrier. In this regard, it is not necessary for a defined oil level in the gear unit to be ensured; in this regard, a potential risk/fault source can accordingly also be ruled out. An oil reservoir for the planetary bearings can be provided by means of the baffle plate unit, in particular with the use of centrifugal forces, even in the case of a horizontal orientation of the drive train or the center longitudinal axis of the gear unit.

In accordance with one exemplary embodiment, the planetary gear unit apparatus has at least one radially running outlet channel for ventilation, in particular in an arrangement at the axial height of the respective end of the planetary gear shafts. This also not least facilitates autonomous setting of advantageous conditions for an inherently fluid-dynamically induced oil flow.

In accordance with one exemplary embodiment, the planetary gear unit apparatus has at least one radially running outlet channel for oil discharge, in particular on an oil flow path in a portion of the planetary carrier, in which the oil medium has already passed the bearings of the planetary gears, in particular in an arrangement in an oil-communicating relation to a/the radially running outlet channel for ventilation, in particular lying axially further to the outside than the ventilation outlet channel. This also facilitates an oil flow which is brought about substantially or exclusively by way of the oil medium per se (without a pressure column which is to be maintained technically) and based on fluid-dynamic effects, with the result that the management of the oil medium system can substantially also take place by way of setting and optionally also actively regulating the operation or the parameters of the at least one nozzle.

In accordance with one exemplary embodiment, the oil medium is conducted exclusively axially (that is to say, exclusively axially apart from a radial portion which leads off starting from the eccentric feed channel and is guided radially outward to the respective planetary gear bearing) by means of the channels in an axial portion which overlaps with the planetary gears, and/or the oil medium is conducted exclusively radially by means of the channels in an axial portion which overlaps on the outlet side with the planetary carrier (that is to say, in an axial region which is downstream of the planets in the oil flow direction and in which there are no more planetary shafts). This also not least facilitates an oil flow induced by way of the oil medium itself without the requirement of an oil pressure column; rather, the transport can take place along the intended oil flow paths based on fluid-mechanical or fluid-dynamic effects, in particular assisted by way of centrifugal forces in radially outer discharge points, wherein the oil supply optionally takes place/can take place exclusively by means of the nozzle/nozzles.

In accordance with one exemplary embodiment, the planetary gear unit apparatus has feed channels or outlet channels which run exclusively strictly axially and/or strictly radially, in each case for the oil medium. This also facilitates the implementation in terms of manufacturing technology, in particular even in the case of a great cost pressure.

In accordance with one exemplary embodiment, an/the oil flow path predefined by the planetary gear unit apparatus is defined/specified at least as follows: outlet of the nozzle, inlet to the respective eccentrically arranged and axially running feed channel as far as the/a bearing of the corresponding planetary gear, ventilation and/or discharge channel (or dispensing channel) beginning, in particular, in the region of the end-side end of a/the (sun) shaft, wherein the ventilation and/or discharge channel are/is preferably provided in an exclusively radial orientation. This not least facilitates an advantageous interaction of the components involved for the oil flow, both on the oil supply side and on the oil discharge side.

One aspect of the invention also relates, furthermore, to an industrial gear unit, for example for a drive train of a vertical mill or a wind power plant, wherein an oil supply can be ensured within the gear unit starting from the nozzles described herein and, inter alia, via the eccentric axial feed channels described herein. The abovementioned object is also achieved in this regard by way of an industrial gear unit, for example for driving a vertical mill, with a planetary gear unit apparatus which is described further above.

One aspect of the invention also relates, furthermore, to management of the oil medium which is as advantageous as possible, based on the feeding/introducing of the oil medium by means of nozzles into the gear unit housing. The abovementioned object is accordingly also achieved by way of the use of a planetary gear unit apparatus in an industrial gear unit, in particular a planetary gear unit apparatus described further above, in particular in a vertical installation position (vertical orientation of the drive train), wherein an oil medium supply is provided via at least one nozzle, provided in/on the gear unit housing, for the supply of oil medium, which nozzle is preferably arranged in an oil-communicating relation/arrangement with respect to an end side of the planetary carrier of the planetary gear unit apparatus (or at least one planetary gear unit stage of the planetary gear unit apparatus), and wherein the oil medium is conducted in such a way that, based on the relative movement of the gear unit components, in particular also in a manner which is driven by gravity and/or centrifugal force, the oil medium is conducted via eccentrically arranged and axially running feed channels which are provided in each case in planetary shafts of the planetary gears of the planetary gear unit apparatus, independently from the planetary carrier to the respective bearing of the respective planetary gear and is discharged from there, in particular via exclusively axially or radially running channel portions, wherein the at least one nozzle is arranged in an oil-communicating relation/arrangement with respect to a circulating diameter of the feed channels. As a result, abovementioned advantages can be realized, in particular also with regard to advantageous management of the oil medium and a freely selectable/definable oil level in the gear unit (or even completely unnecessary oil level). For example, the use can also take place according to the invention in a drive train of a wind power plant.

One aspect of the invention also relates, furthermore, to the way of providing the oil medium in the gear unit and at the individual gear unit components, and the way of discharging gear unit oil from the individual gear unit components or from the gear unit. In this regard, the abovementioned object is also achieved by way of a method as claimed in the corresponding further independent method claim, namely by way of a method for providing oil medium in a planetary gear unit apparatus, in particular in a planetary gear unit apparatus which is described further above, in particular in an industrial gear unit, wherein the oil medium is supplied (in particular, sprayed) and fed in (in particular, in a contactless manner without physical solid transmission bodies) via at least one nozzle which is provided in/on the gear unit housing of the planetary gear unit apparatus, wherein the oil medium is conducted, at least in an axial portion which overlaps with the planetary gears of the planetary gear unit apparatus, by means of feed channels, arranged eccentrically in planetary shafts of the planetary gears and running axially therein, to a respective bearing of the planetary gears in such a way that, based on the relative movement of the gear unit components, the oil medium is conducted to the respective bearing of the respective planetary gear and is discharged from there, in particular is conducted via substantially exclusively axially running channel portions to the bearings of the respective planetary gear and is discharged via exclusively radially running channel portions from the planetary carrier, in particular by the oil flow taking place substantially by way of setting and optionally also actively regulating the operation or the parameters of the at least one nozzle (that is to say, without an additional technical pressure column and without a build-up of pressure at any physically predefined oil transfer points). Here, the at least one nozzle is arranged in an oil-communicating relation/arrangement with respect to a circulating diameter of the feed channels. This results in the abovementioned advantages, in particular also with regard to a particularly sustainable method of operation and particularly simple and also efficient/effective management of the oil medium.

Summary: the invention relates to a planetary gear unit apparatus, in particular for industrial gear units, for example in the case of a vertical orientation of the drive train, wherein the planetary gear unit apparatus has: a planetary carrier with planetary gears coupled to it, and a planetary ring gear which is supported in a gear unit housing; wherein at least one nozzle for feeding in oil medium is provided in/on the gear unit housing, wherein in each case at least one eccentrically arranged and axially running feed channel for oil medium is provided in the planetary gears, with the at least one nozzle in an oil-communicating relation/arrangement with respect to the feed channel or with respect to a corresponding circulating diameter of the feed channels.

This also not least facilitates a high efficiency in conjunction with the management of oil medium.

BRIEF DESCRIPTION OF THE FIGURES

In the following figures of the drawing, the invention will be described in even greater detail on the basis of preferred exemplary embodiments, wherein the features which are shown in the following text can represent one aspect of the invention both in each case individually and in combination, and wherein reference is made to the other figures of the drawing for designations which are not explicitly described in a respective figure of the drawing. In the drawing, in each case in a diagrammatic illustration.

DETAILED DESCRIPTION OF THE FIGURES

Figure 1:
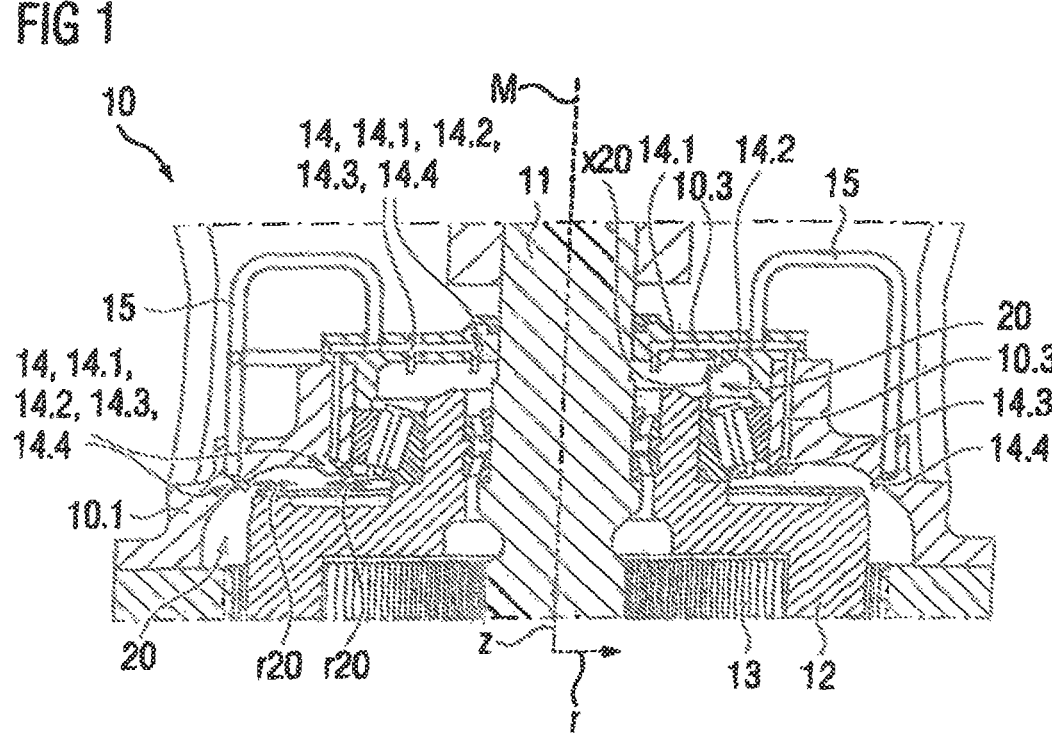
FIG. 1 shows a sectioned side view of a detail of a planetary gear unit apparatus in accordance with one exemplary embodiment in the region of one of the end sides of the planetary carrier.

The invention will first of all be explained with general reference to all designations and figures. Special features or individual aspects or aspects of the present invention which are clearly visible/presentable in the respective figure will be discussed individually in conjunction with the respective figure.

A planetary gear unit apparatus 10 is provided with a gear unit housing 10.1 and a planetary ring gear 10.2 with an internal toothing system, in which a plurality of planets or planetary gears 13 circulate which are mounted in a planetary carrier 12. The planets interact with a shaft 11 or with a/the sun (sun gear) of the shaft. The planets are each mounted in at least one bearing 13.5 about a planetary shaft 13.1 or planetary shaft unit (for example, bearing pin), wherein the respective planetary shaft is preferably secured by way of an anti-rotation safeguard 13.3 against relative rotation with respect to the planetary carrier.

Nozzles 14 (in particular, spray nozzles or feed nozzles) are provided on the inside in the gear unit housing, in particular on an inner surface of the gear unit housing, which nozzles 14 are connected via lubricating bores or feed channels 10.3 to an oil medium supply 15 (In particular, supply line/pressure line or pressure line system), and by means of which nozzles 14 the oil medium can be forwarded to the bearings of the planets, in particular via eccentrically arranged feed channels. In the exemplary embodiments which are described in the figures, for example, nozzles are provided in at least four different radial positions: at least one first nozzle 14.1 which is oriented, in particular, axially onto a/the bearing of the sun shaft, at least one further (second) nozzle 14.2 which is oriented, in particular, axially onto a/the bearing of the planetary carrier, at least one further (third) nozzle 14.3 which is oriented, in particular, axially/radially onto a/the bearing of the planetary carrier and/or onto the circulating diameter of the planetary shafts and/or onto a/the baffle plate unit or a cavity formed by way of the latter, and at least one further (fourth) nozzle 14.4 which is oriented, in particular, axially/radially onto a shoulder of the planetary carrier or into the laterally outer region of the planetary carrier in the direction of the planetary ring gear.

Thanks to the nozzles, oil transfer points which are used in a widespread manner according to the prior art, are linked physically and/or require contact are not necessary. Rather, the nozzles 14 enable a contactless spray region 20 with a predefined (or, depending on pilot pressure and oil supply, optionally also open-loop/closed-loop controllable, for example predefinable individually for defined operating states) radial extent r20 and/or axial extent x20, in particular at least as far as the end side of the planets and/or the corresponding bearings to be supplied of the shaft and planetary carrier.

At least one baffle plate unit 16 is preferably provided on the end side on the planetary carrier, in particular over the full periphery, in particular in a ring-like manner. Together with the planetary carrier, the baffle plate unit 16 can surround an oil reservoir which is sealed off counter to the centrifugal force during operation as intended (that is to say, in the case of circulating planets). As a result, the oil supply and oil propagation and oil forwarding within the gear unit can also be provided or ensured with high reliability, as explained in greater detail in the following text. The functionality described herein of the baffle plate unit 16 can also optionally have already been integrated functionally into the planetary carrier by way of corresponding shaping of the planetary carrier, that is to say without a baffle plate unit in the sense of a separate component being required.

A plurality of lubricating bores or feed or discharge channels 18 are provided in the rotating gear unit components, in particular comprising the abovementioned eccentric axial bores or feed channels 18.1 in the planetary shafts 13.1 (in particular in an arrangement which is axially parallel and as far radially to the outside as possible, that is to say lying eccentrically), and one or more preferably radially running ventilation bores 18.2 (or outlet channels) and/or discharge bores 18.3 (or outlet channels) in the region of the outlet or suction side. The oil medium can leave the respective channel, in particular, via a radially outwardly leading radial portion 18.11 or a radially outer discharge point P18, in particular also assisted by way of fluid-dynamically acting centrifugal forces.

For example, at least one lower gap seal 10.5 is provided in the housing 10.1 or is configured on the latter, via which gap seal 10.5 an outflow or a discharge of oil medium F can be realized. Fully peripheral sealing of the housing is required, in particular, in the case of a vertical orientation of the drive train (or of its center longitudinal axis M). To this end, one or more (in particular, respectively fully peripheral) seals 19 can be provided, in particular also at least one gap seal 10.5 which lies at the bottom in the oil bath and is provided at least partially by way of a housing component. The seals 19 described herein can optionally also comprise additional seal elements (not shown/described explicitly here).

In particular in the case of a vertical orientation of the gear unit or the drive train, the invention makes it possible for a height level zF of the actively used oil medium to be decoupled from an actual level/filling level of the gear unit oil in the gear unit, in particular by the oil medium being provided in a comparatively small and directly fed oil reservoir (in particular, formed by way of a/the baffle plate unit) at a comparatively high point. In the exemplary embodiments which are described herein, the nozzles are preferably arranged at least partially in an axial edge region of the planetary carrier, and an oil reservoir which lies comparatively high up is formed on the end side of the planets. As a result, a pressure column driven by gravity for the oil medium can also be provided largely independently of the method of operation of the nozzles (in a passive way), which pressure column (in the case of a vertical orientation of the drive train) exerts, in addition to centrifugal forces, an advantageous effect for the oil supply and distribution (autonomously, without additional pumping or open loop/closed loop control complexity).

The following direction specifications are made in the figures: radial direction r (in particular, horizontal, in the case of a vertical orientation of the center longitudinal axis of the gear unit), axial direction x or axial orientation of the gear unit or drive train (for example, vertical), and height direction z (vertical), for example in accordance with the axial orientation of the drive train. In the exemplary embodiments which are shown, the axial direction x corresponds at least approximately to the vertical direction z.

In the following text, special features of the invention will be explained with references to individual figures and/or exemplary embodiments.

FIG. 1 shows a detail of a planetary gear unit apparatus 10 in the region of the (sun) shaft 11 and the planetary carrier 12. Four nozzles which are arranged in different radial positions are directed onto the corresponding end side of the planetary carrier, on the respective side of the center longitudinal axis, that is to say a total of at least eight nozzles, wherein the arrangement which is shown can also be repeated in a further angular position about the center longitudinal axis (for example, 16 nozzles). The respective first nozzle 14.1 counted from the inside radially to the outside is oriented onto a bearing of the (sun) shaft 11, and the respective second nozzle 14.2 counted from the inside radially to the outside is oriented onto a bearing of the planetary carrier 12.

It can also be seen from FIG. 1 that a comparatively large number of nozzles which are provided at different radial and optionally also peripheral positions can facilitate a uniform distribution of the oil medium. By way of the provision of a number of nozzles which can be optimized individually in the respective application (corresponding to the oil requirement) and/or their size (optionally nozzle-specific throughput), in particular in a plurality of radial positions or else at a plurality of points distributed over the periphery (for example in each case fastened to the housing inner wall), the relevant components or gear unit components can be supplied with the gear unit oil which is fresh and, for example, also cooled. Here, the oil flow path can also be predefined in such a way that oil medium is driven radially to the outside from the center by way of centrifugal force acting in the case of gear unit rotation. An oil reservoir is preferably also provided for this purpose on an end side of the planetary carrier. For example, channel-bound oil forwarding takes place exclusively starting from an oil reservoir of this type.

Figure 2:
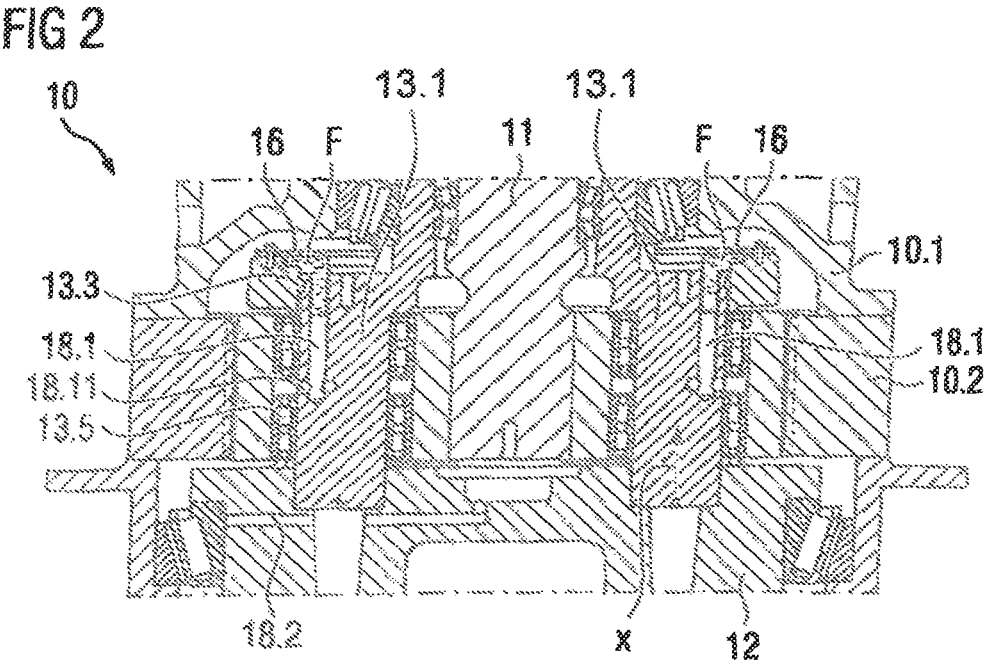
FIG. 2 shows a further sectioned side view of a further detail of a planetary gear unit apparatus in accordance with a further exemplary embodiment in an axially central region of the planetary carrier.

FIG. 2 shows a detail of a planetary gear unit apparatus 10 in the region of the planetary carrier 12 and the planetary gears 13. The oil medium which is sprayed in by the nozzles can be provided at least partially in an oil reservoir which is formed by way of a baffle plate unit 16 on the end side on the planetary carrier, in particular also in conjunction with centrifugal forces, and can be fed from there to the eccentric feed channels 18.1.

It can also be seen from FIG. 2 that the management of the oil medium (oil system) can also be optimized by way of at least one baffle plate unit which is, in particular/preferably, fastened, for example screwed, to the planetary carrier. The at least one baffle plate unit is preferably integrated relative to the adjacent further gear unit components in such a way that it is prevented that centrifugal forces drive the oil medium radially to the outside from end-side surface portions, in particular from the planetary carrier upper side (or end side). Thanks to a baffle plate unit which is arranged in this way, the oil medium can also be provided in a type of cavity or reservoir, in particular for the purpose of introduction into the eccentric feed channels. In this respect, a reservoir of this type can also be provided when the oil filling level in the gear unit lies at a considerably lower height position than the baffle plate unit. In this respect, a retained oil volume can be provided constantly at the axial bores or eccentric feed channels, with the result that the bearings on the planetary shafts can be lubricated with satisfactory robust system reliability.

FIG. 2 highly diagrammatically shows, furthermore, oil medium F (oil fluid, in particular gear unit oil) which is present in the reservoir which is formed by way of the baffle plate unit, and moves from there into the eccentrically arranged axially running channels. The oil medium F is shown here only in a part portion of the feed channels for the purpose of improved clarity.

Figure 3:
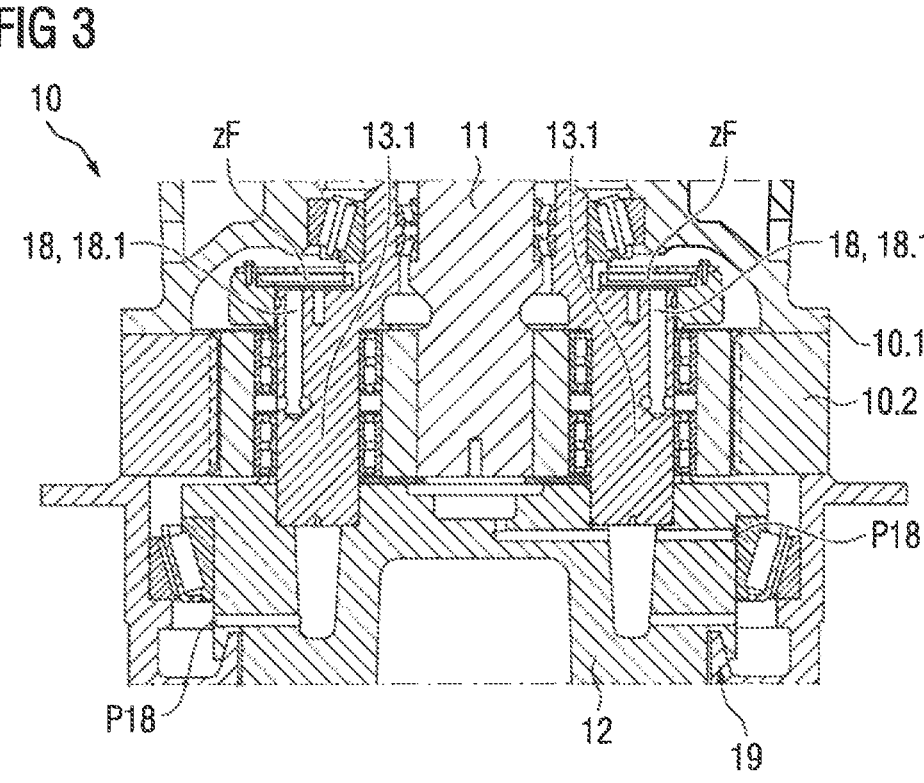
FIG. 3 shows a further sectioned side view of a further detail of a planetary gear unit apparatus in accordance with a further exemplary embodiment in an axially central region of the planetary carrier.

FIG. 3 shows a detail of a planetary gear unit apparatus 10 in the region of the planetary carrier 12 and the planetary gears 13 as far as a housing seal 19 (lying at the bottom in the case of a vertical orientation of the drive train). In this respect, the complete (with regard to the axial extent) channel-bound oil flow path in accordance with one of the exemplary embodiments can be seen, starting from the oil reservoir or from the height level zF ensured by way of this as far as at least one discharge point P18.

It can also be seen from FIG. 3 that the lubricating bores or feed channels which are provided in the planetary shaft are preferably configured and arranged in such a way that the lubrication of the bearings is assisted by way of the centrifugal force effect, and the oil medium is pressed or sucked into the axle bores. In particular, an anti-rotation safeguard of the planetary shafts can also ensure that the bores or channels are oriented in accordance with the direction of effect of the centrifugal force or with regard to a satisfactory centrifugal force effect, in particular as far radially to the outside as possible. Merely a comparatively short radial outlet leads as far as the outer shell surface of the respective planetary shaft. In this respect, the possible eccentricity can also preferably be maximized.

Figure 4:
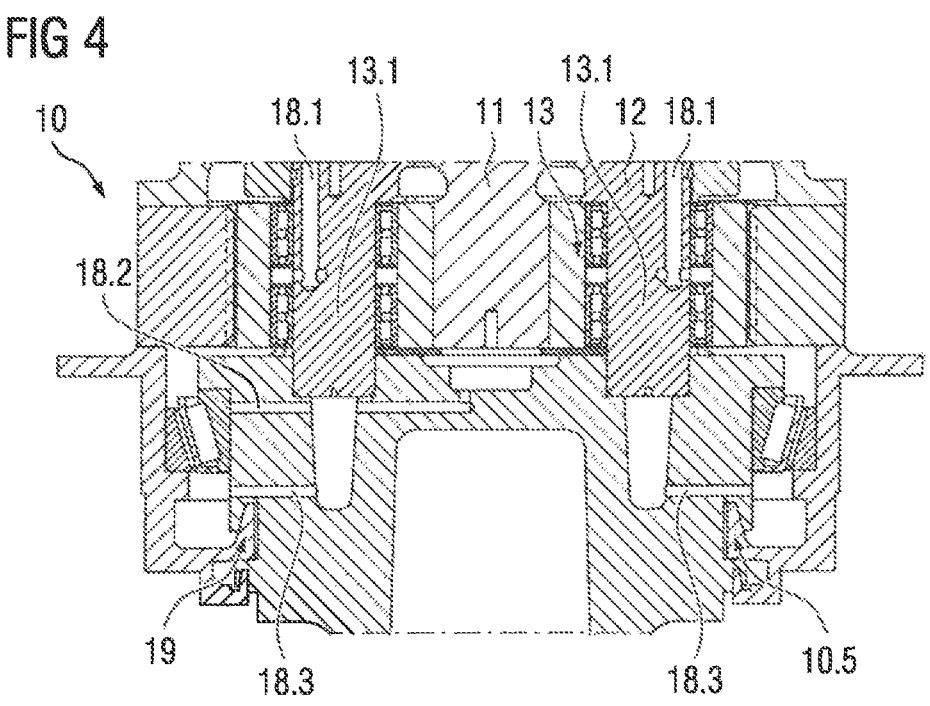
FIG. 4 shows a further sectioned side view of a further detail of a planetary gear unit apparatus in accordance with a further exemplary embodiment in the region of the other end side of the planetary carrier.

FIG. 4 shows a detail of a planetary gear unit apparatus 10 in the region of a housing seal 19 (lying at the bottom in the case of a vertical orientation of the drive train). At least one of the discharge channels 18.2 also leads to a bearing of the planetary carrier.

It can be seen from FIG. 4 that the engagement (spline system) of the input shaft with the planets can also be lubricated via inner nozzles; in other words: physical oil transfer points or additional supply channels are not required either for this region of the gear unit. Via ventilation and outlet bores in the planetary carrier, the oil medium which is heated by way of contact with bearing and/or spline system and other rotating gear unit components can flow out or be expelled, in particular also driven by centrifugal force. The oil medium can also, in particular, be discharged via outlets on a lower gap seal from the gear unit housing, and can be fed to an oil supply unit (not shown), where it can be cooled down further.

What is claimed is:

1. A planetary gear unit apparatus, comprising:
a planetary carrier;
a gear unit housing;
at least one nozzle provided in/on the gear unit housing and designed to feed an oil medium;
planetary shafts, each planetary shaft including an eccentrically arranged and axially running feed channel for the oil medium, with the at least one nozzle in an oil-communicating relation/arrangement with respect to the feed channel or to a corresponding circulating diameter of the feed channels;
planetary gears coupled to the planetary carrier and rotating on the planetary shafts in one-to-one correspondence; and
a planetary ring gear supported in the gear unit housing.

2. The planetary gear unit apparatus of claim 1, wherein the eccentrically arranged and axially running feed channel of the planetary gear is provided at least as far as a central axial region of the planetary gear, in particular as far as half an axial length of a toothing portion of the planetary ring gear, and is guided or connected radially outwards there, in particular exclusively radially outwards.

3. The planetary gear unit apparatus of claim 1, wherein the eccentrically arranged and axially running feed channel includes exclusively strictly axially and/or strictly radially extending portions.

4. The planetary gear unit apparatus of claim 1, wherein the eccentrically arranged and axially running feed channel opens at a bearing of the planetary gear.

5. The planetary gear unit apparatus of claim 1, further comprising a planetary shaft mounted such that it cannot rotate on the planetary carrier, in particular by means of an anti-rotation safeguard, wherein the planetary gear is mounted about the planetary shaft, with the eccentrically arranged and axially running feed channel being provided in the planetary shaft.

6. The planetary gear unit apparatus of claim 5, wherein the planetary gear is mounted rotatably about the planetary shaft in such a way that the planetary shaft remains oriented in a predefined circumferential/orienting position, in particular with the eccentrically arranged and axially running feed channel in a predefined eccentric radial position which lies to a maximum extent radially outwards with regard to an instantaneous center of rotation.

7. The planetary gear unit apparatus of claim 5, further comprising a plurality of said at least one nozzle, wherein at least one of the nozzles is guided, or is oriented, into a region on an end side of a respective one of the planetary shafts or on an end side with respect to a circulating diameter of the planetary gear shafts.

8. The planetary gear unit apparatus of claim 1, further comprising a plurality of said at least one nozzle for providing oil medium, with the nozzles distributed over an internal periphery of the gear unit housing in a radial direction and/or in a peripheral direction.

9. The planetary gear unit apparatus of claim 1, further comprising a plurality of said at least one nozzle, wherein at least one of the nozzles is guided, or is oriented, into a region on an end side of a bearing of the planetary carrier and/or on an end side of a bearing of a sun shaft which is guided within the planetary carrier.

10. The planetary gear unit apparatus of claim 1, wherein the planetary carrier is configured on an inlet-side without a feed channel.

11. The planetary gear unit apparatus of claim 1, wherein at least one feed channel defines for an oil feed an oil flow path which does not run through the planetary carrier at least on a pressure side, or ends in front of the planetary carrier on the pressure side.

12. The planetary gear unit apparatus of claim 1, further comprising a baffle plate unit provided on an end side of the planetary gears, in particular in a radial overlap of the respective eccentrically arranged and axially running feed channel, in particular in a radially inwardly open arrangement, in particular in an arrangement which is fastened to the planetary carrier.

13. The planetary gear unit apparatus of claim 1, further comprising a baffle plate unit surrounding, in an oil-communicating relation with respect to the eccentrically arranged and axially running feed channels, an oil reservoir which is sealed off counter to a centrifugal force during operation.

14. The planetary gear unit apparatus of claim 7, further comprising at least one radially running outlet channel for ventilation, in particular in an arrangement at an axial height of a respective end of the planetary gear shafts.

15. The planetary gear unit apparatus of claim 14, further comprising at least one radially running outlet channel for oil discharge, in particular in an arrangement in an oil-communicating relation to the radially running outlet channel for ventilation, in particular lying axially further outwards than the radially running outlet channel for ventilation.

16. The planetary gear unit apparatus of claim 1, wherein the oil medium is conducted exclusively axially via the feed channels in an axial portion which overlaps with the planetary gears, and/or is conducted exclusively radially via the feed channels in an axial portion which overlaps on an outlet side with the planetary carrier.

17. The planetary gear unit apparatus of claim 15, wherein the feed channels or the outlet channels run each exclusively strictly axially and/or strictly radially for the oil medium.

18. The planetary gear unit apparatus of claim 1, wherein a predefined oil flow path is defined at least as follows: outlet of the nozzle, inlet to the respective eccentrically arranged and axially running feed channel as far as a bearing of the corresponding planetary gear, at least one of a ventilation channel and a discharge channel beginning, in particular, in a region of an end-side end of a sun shaft, wherein the at least one of the ventilation channel and the discharge channel is preferably provided in an exclusively radial orientation.

19. An industrial gear unit for driving a vertical mill, the industrial gear unit comprising the planetary gear unit apparatus set forth in claim 1.

20. The planetary gear unit apparatus of claim 1, wherein an oil medium supply is provided via the at least one nozzle which is arranged in an oil-communicating relation/arrangement with respect to an end side of the planetary carrier, and wherein the oil medium is conducted in such a way that, based on a relative movement of gear unit components, in particular also in a manner which is driven by gravity and/or centrifugal force, the oil medium is conducted via the eccentrically arranged and axially running feed channels which are provided in planetary shafts of the planetary gears, independently from the planetary carrier to a respective bearing of the respective planetary gear and is discharged from there, in particular via exclusively axially or radially running channel portions, wherein the at least one nozzle is arranged in an oil-communicating relation/arrangement with respect to a circulating diameter of the feed channels.

21. A method for providing oil medium in a planetary gear unit apparatus in a vertical mill, said method comprising:

supplying and feeding an oil medium via at least one nozzle provided in/on a gear unit housing of the planetary gear unit apparatus; and conducting the oil medium at least in an axial portion which overlaps with planetary gears of the planetary gear unit apparatus via feed channels, arranged eccentrically in planetary shafts of the planetary gears and running axially therein, to a respective bearing of the planetary gears in such a way that, based on a relative movement of gear unit components, the oil medium is conducted to the respective bearing of the respective planetary gear and is discharged from there, in particular is conducted via exclusively axially running channel portions to the bearings of the respective planetary gear and is discharged via exclusively radially running channel portions from a planetary carrier of the planetary gear unit apparatus, wherein the at least one nozzle is arranged in an oil-communicating relation/arrangement with respect to a circulating diameter of the feed channels.

* * * * *